(12) United States Patent
Muller et al.

(10) Patent No.: US 9,511,787 B2
(45) Date of Patent: Dec. 6, 2016

(54) DEVICE FOR LIFTING AND MOVING OBJECTS

(71) Applicant: MP-System GmbH, Seewen (CH)

(72) Inventors: Gerhard Muller, Brunnen (CH); Hans Peter Abegg, Stallikon (CH)

(73) Assignee: MP-System GmbH, Seewen (CH)

( * ) Notice: Subject to any disclaimer, the term of this patent is extended or adjusted under 35 U.S.C. 154(b) by 0 days.

(21) Appl. No.: 14/782,281

(22) PCT Filed: Mar. 17, 2014

(86) PCT No.: PCT/CH2014/000031
§ 371 (c)(1),
(2) Date: Oct. 2, 2015

(87) PCT Pub. No.: WO2014/161097
PCT Pub. Date: Oct. 9, 2014

(65) Prior Publication Data
US 2016/0046312 A1    Feb. 18, 2016

(30) Foreign Application Priority Data

Apr. 2, 2013  (CH) .......................................... 697/13

(51) Int. Cl.
*B62B 5/00* (2006.01)
*B62B 3/06* (2006.01)
(52) U.S. Cl.
CPC ........... *B62B 5/0083* (2013.01); *B62B 3/0618* (2013.01); *B62B 2202/30* (2013.01); *B62B 2202/34* (2013.01); *B62B 2202/70* (2013.01); *B62B 2205/14* (2013.01)

(58) Field of Classification Search
CPC ............ A47G 7/041; A61G 5/14; A01G 9/02; B62B 5/0083; B62B 2205/14
See application file for complete search history.

(56) References Cited

U.S. PATENT DOCUMENTS 4,993,736 A * 2/1991 Garman ............... A61G 5/1018
280/250.1
5,669,086 A * 9/1997 Garman ................... A61G 5/00
254/423

(Continued)

FOREIGN PATENT DOCUMENTS

FR          1390292 A     2/1965

OTHER PUBLICATIONS

International Search Report for PCT/CH2014/000031 in German, mailed Jul. 25, 2015, p. 3-4.

(Continued)

*Primary Examiner* — Brodie Follman
(74) *Attorney, Agent, or Firm* — Cardinal Law Group (57) ABSTRACT

The device is used to raise and move objects. The device has a box-like insert (2) for installing in the bottom side (3) of the object to be lifted. The box-like insert has at least three wheels (14), which are integrated in the box-like insert (2). By means of a pneumatic or hydraulic lifting apparatus in the box-like insert (2) having a hand pump (8) and a valve (9), the wheels (14) can be temporarily extended or pivoted downward out of the insert (2). The object equipped with the insert (2) is thus raised and can then be rolled away on the wheels (14).

12 Claims, 9 Drawing Sheets

(56) References Cited

U.S. PATENT DOCUMENTS

| | | | | |
|---|---|---|---|---|
| 6,128,853 | A * | 10/2000 | Klonel | A01G 9/02 47/39 |
| 6,594,951 | B1 * | 7/2003 | Reynolds | A01G 9/02 47/39 |
| 6,929,249 | B1 * | 8/2005 | Kim | B66F 3/35 254/2 B |
| 7,275,345 | B2 * | 10/2007 | Cosse, III | A47G 7/041 15/261 |
| 7,594,698 | B1 * | 9/2009 | Palmer | A61G 5/14 297/313 |
| 8,113,587 | B1 * | 2/2012 | Zarinfar | A61G 5/08 297/337 |
| 8,282,111 | B2 * | 10/2012 | Hailston | B62B 3/0618 280/43.12 |
| 9,056,755 | B1 * | 6/2015 | Moy | B66F 3/24 |
| 9,212,035 | B1 * | 12/2015 | Smith | B66F 3/247 |
| 2006/0042878 | A1 * | 3/2006 | Cosse, III | A47G 7/041 187/250 |
| 2012/0024330 | A1 | 2/2012 | Ma | |
| 2012/0286486 | A1 | 11/2012 | Varney et al. | |
| 2016/0046312 | A1 * | 2/2016 | Muller | B62B 3/0618 280/43.23 |

OTHER PUBLICATIONS

Written Opinion for PCT/CH2014/000031 in German, mailed Jul. 25, 2014, p. 3-5.
International Search Report for PCT/CH2014/000031 in English, mailed Jul. 25, 2015, p. 1-2.
Written Opinion for PCT/CH2014/000031 in English, mailed Jul. 25, 2014, p. 3-6.

* cited by examiner

DEVICE FOR LIFTING AND MOVING OBJECTS

This invention relates to a device which can be used to raise and move objects, preferably objects that one cannot move manually, and especially those that cannot be moved easily only manually. There are many practical cases wherein in households, hospitals, homes, office building, or in hotels, etc., a relatively heavy object needs to be moved, for example to make a certain location accessible for cleaning or for repairs, or to simply move this object somewhere else. Among examples of such objects can be mentioned, in a list that is not comprehensive: pianos, safes, flowerpots, flower boxes, flower planters, umbrella stands, furniture items, etc.

Up until now, assistance of other persons was required in such cases. Two or three persons can often provide a remedy for such a situation. However, there are also objects that are difficult to get hold of to lift them up, such as a safe, but also large, round flowerpots having a tree or a large plant planted inside them.

The objective of the present invention is to provide a device which can greatly facilitate the raising an moving of objects. In particular, the objective of the invention is to greatly facilitate the raising and moving of objects that cannot be raised manually by a single person.

This objective is achieved by a device for raising and moving objects, which is equipped with a box-like insert for the installation of objects to be raised in the lower part thereof, and which is provided with at least three wheels integrated in the box-like insert, as well as with a pneumatic or hydraulic raising device arranged in the box-like insert and with an associated hand pump and valve in order to temporarily extend or pivot the wheels from the box-like insert downward so that the object can be raised and then rolled away on the wheels.

The figures show the devices in multiple views, and its construction and function will be further described and its use explained.

The figures show.

Figure 1:
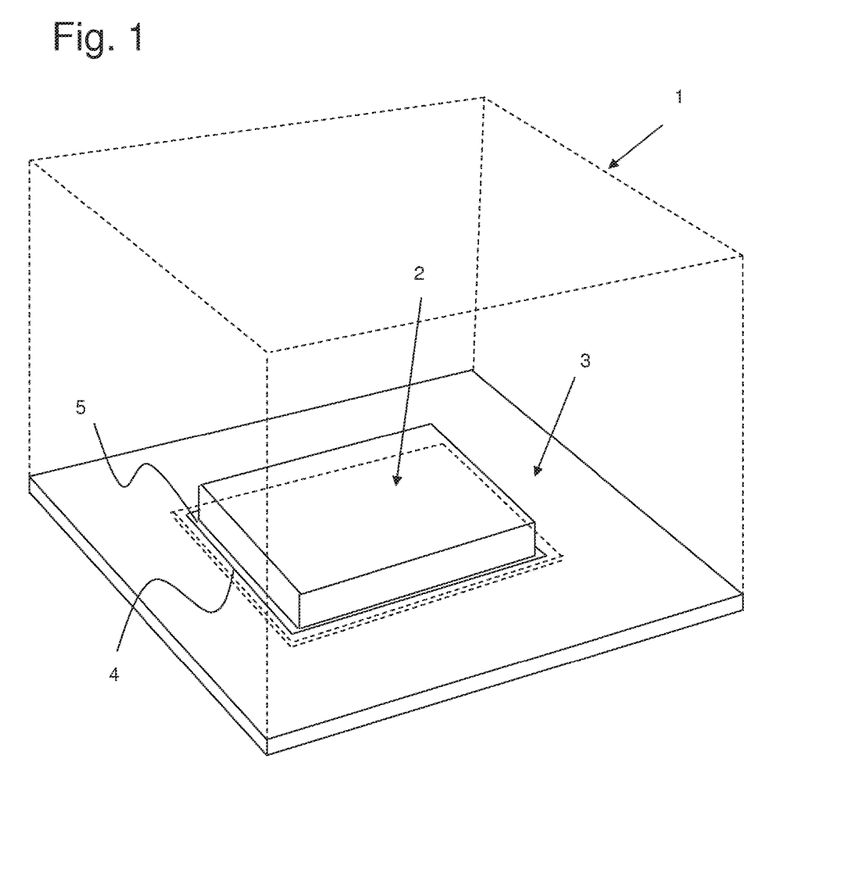
FIG. 1: The bottom of an object, seen from above, to be fitted with the box-like foundation.

FIG. 1 shows a view of an object 1 which is provided with the device, wherein the upper part of the object 1 is indicated by dashed lines. In the bottom 3 or in the bottom plate of the object 1 is cut out a rectangular recess 4. The device according to the invention is inserted in this recess 4 from below in the form of a box-like insert 2, which is open at the bottom and which is provided with an outward projection 5 therein. The outer edge of this projection 5 is indicated with dashed lines. On this projection 5 rests the bottom 3 of the object 1. This edge takes up the load of the object 1 when the device is raised with the object.

Figure 2:
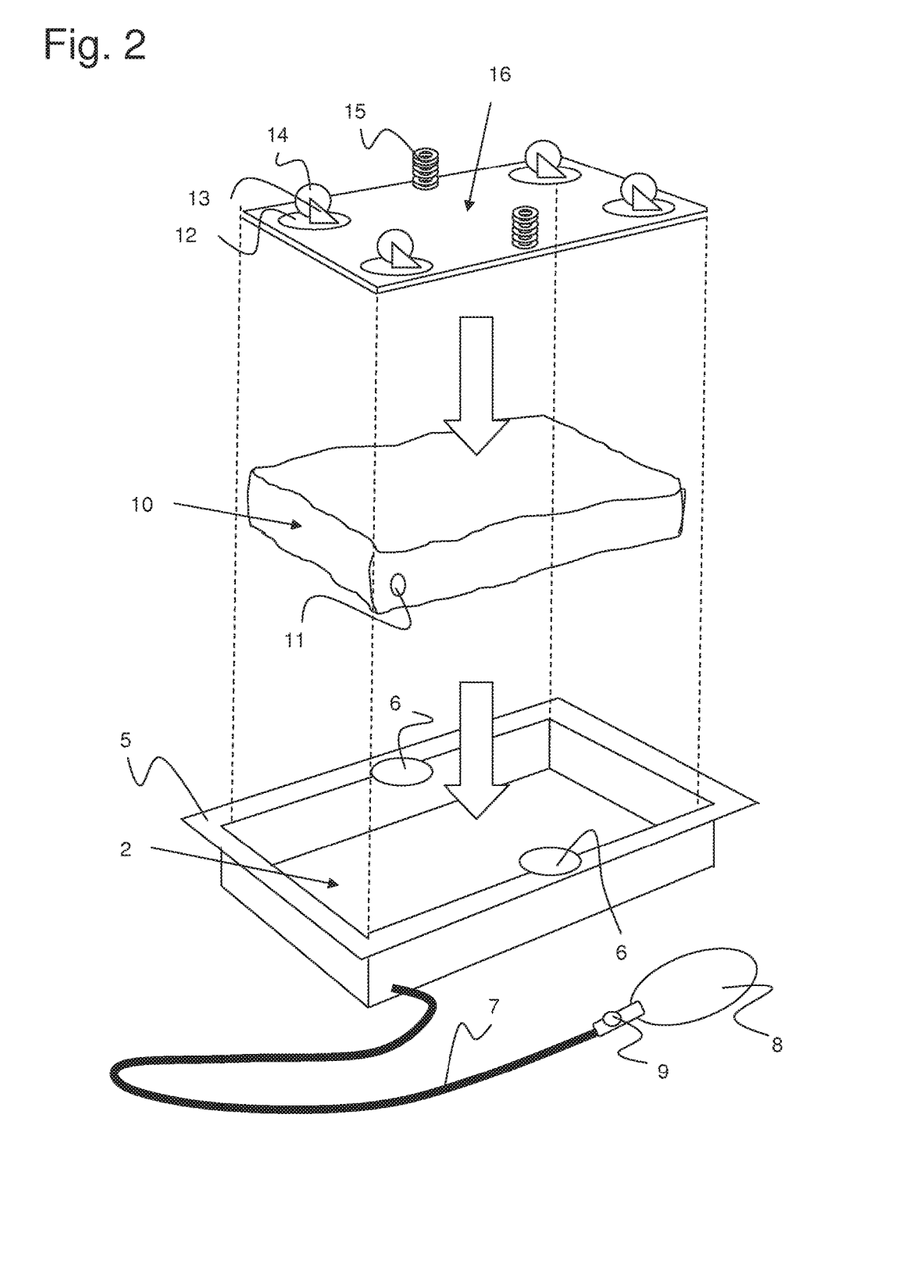
FIG. 2: The individual elements of the device shown separately in upside-down position.

The interior of the box-like insert of the device can be seen in FIG. 2, in which this insert 2 is shown in upside-down position, so that the individual elements are shown separated in an exploded view. The insert 2 here consists of a sheet metal box having a projection 5 at is upper edge. In the central part of the longitudinal sides are mounted support plates 6, which are projecting inwardly and whose purpose will be explained later. Another part of the device is a pneumatic inflatable cushion 10, which fits inside the box-like insert 2 and which is equipped with a port 11 for an air hose. A sheet metal plate 16 comes to rest on this cushion 11, which is here indicated in the upper part, and which is in the illustrated example equipped with four freely steered wheels 14. At least three wheels 14 are required, and three wheels are also advantageous when the load is to be raised to a position that is not too high. However, more than three or four wheels can be also provided. The hubs 12 mounted via ball bearings on this sheet metal plate 16, so that they can be turned easily, even under a load. On the hubs 12 are mounted in a fixed manner chassis 13 of the wheels 14, on which are finally rotatably mounted the wheels 14. The wheels 14 are preferably wheels made of plastic material having a running surface that is several centimeters wide so as to divide the load of the object 1 onto a sufficient running surface, and so that the bottom, over which the load is rolled, will not be damaged in any way. Instead of plastic wheels, steel wheels provided with a rubberized or plastic running surface may be also employed, or steel wheels provided with solid rubber tires. Compression springs 15 are arranged between the wheels 14 on the sheet metal plate 16. In the example indicated here, each compression spring is arranged at the edges of the longitudinal sides of the rectangular sheet metal plate 16. Such compression springs are advantageously arranged in the same manner also in the central part of the wide side of the sheet metal plate 16. These elements, which is to say the sheet metal plate 16 with the wheels, the air cushion 10 and the box-like insert are assembled together as indicated by the arrows. The cushion 10 will be set in the inner part of the box-like insert 2, and the sheet metal plate 16 will lie on top of that, wherein he extending support plates 6 are then finally resting on the upper side of the compression springs 15 so that they will have an effect exerted between the sheet metal 16 and the box-like insert 2, namely so that the sheet metal plate 16 will be pushed into the box-like insert 2 as a result of the compression exerted by the cushion 10. The cushion 10 can be inflated by means of a hand pump 8, which is provided here in the form of bellows, through an air hose 7. A valve 9 ensures that that the air for the pumping can reach the inner part from outside, and that when pumping is performed, it is supplied with the one-way operation of the valve into the air hose 7. The pumped air can stream from the bellows only into the air hose 7 and then be supplied into the cushion 10. The valve 9 is opened when a push button on valve 9 is actuated, and the pumped air can then escape outside from the cushion 10 through the air hose 7 and the valve 9.

Figure 3:
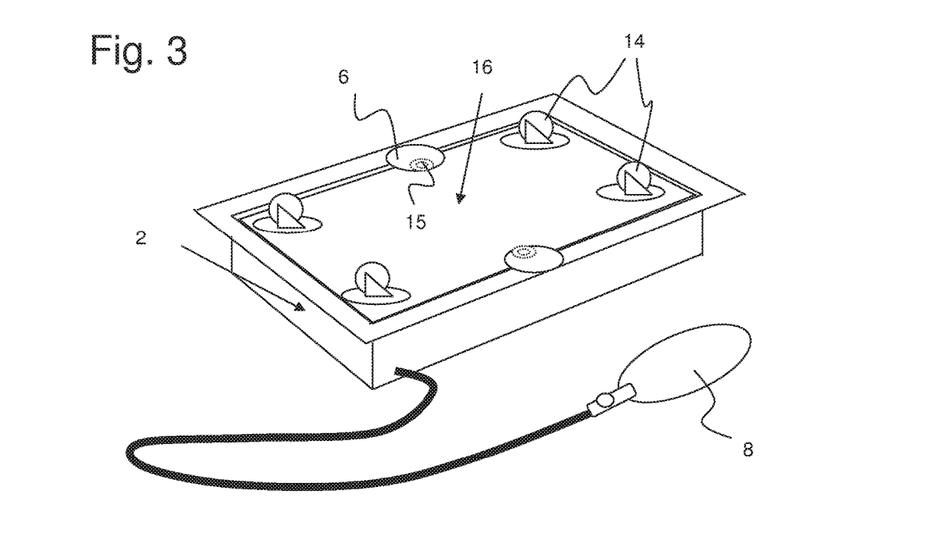
FIG. 3: The device in upside-down position with extended wheels.

FIG. 3 shows the device with an inflated cushion in the inner part of the box-line insert 2, which is not visible in this illustration. The sheet metal 16 with its four wheels 14 is now pushed as far as possible in the outward direction, which takes place against the force of the compression springs 15, and of course against the load to be raised, when the insert 2 is installed on an object 1 that needs to be raised. The sheet metal plate 16 comes to a stop at the support plates 6. Other and stronger stopping elements can be installed as well if required, for example with welded or screwed flat steel bars, by the edge of the box-like insert 2, or even with welded or screwed profiles, which protrude into the clear opening of the box-like insert 2, or which are respectively extended all the way over this clear opening of the box to the other side. Depending on situation, considerable forces can be generated, and the cushion lifts with the sheet metal plate 16 loads from 50 kg to 500 kg depending on the execution.

Figure 4:
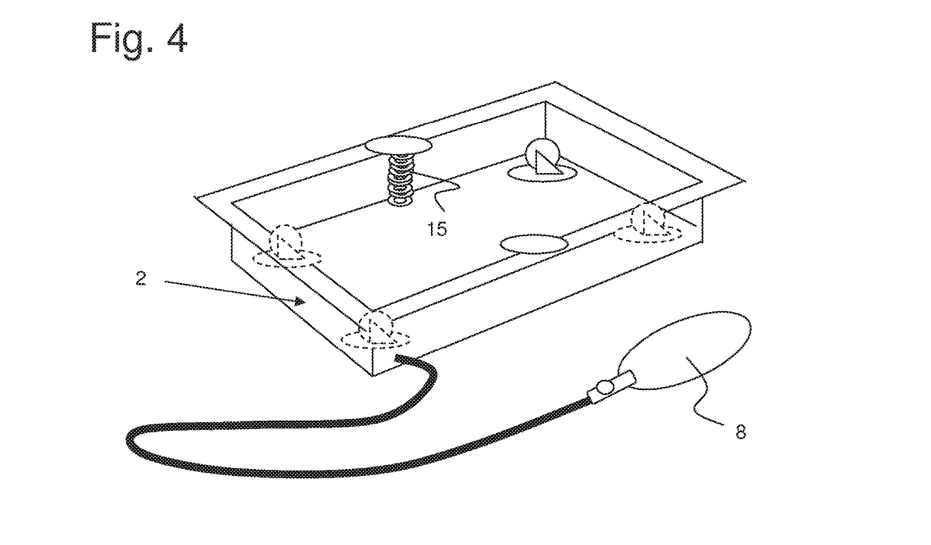
FIG. 4: The device in upside-down position with retracted wheels.

FIG. 4 illustrates the situation when the cushion 10 has been emptied, which is to say when an object has been lowered. This is carried out by opening the valve 9 on the pump. The compression springs will then force the sheet metal plate 16 into the interior of the box-shaped insert 2 and the cushion 10 will thus be compressed and the air will be pressed out from it. The wheels 14 are in this state lowered so far into the box-shaped insert 2 that they are no longer protruding from it.

This inserted is shown as indicated in FIGS. 2 through 4 reversed by 180° C. compared to the FIG. 1, namely installed in the bottom of an object 1. A similar object can be a flower crate or a large flowerpot, or any other object that cannot be easily raised or moved by a single person. This can be for instance a piano, a safe, or furniture items of any kind that have to be moved from time to time. In such a case, the installation of such a device is advantageous. Especially with large flowerpots or boxes for plants, the installation of the device is very advantageous because they have to be moved from time to time to make them accessible also in the corners and in the areas in the rear. In homes, hospitals, office buildings, etc., such heavy flowerpots and boxes for plants frequently present a challenge for the cleaning staff. Because it is hard to move them, cleaning in the lower regions and in the regions in the rear is often neglected.

Figure 5:
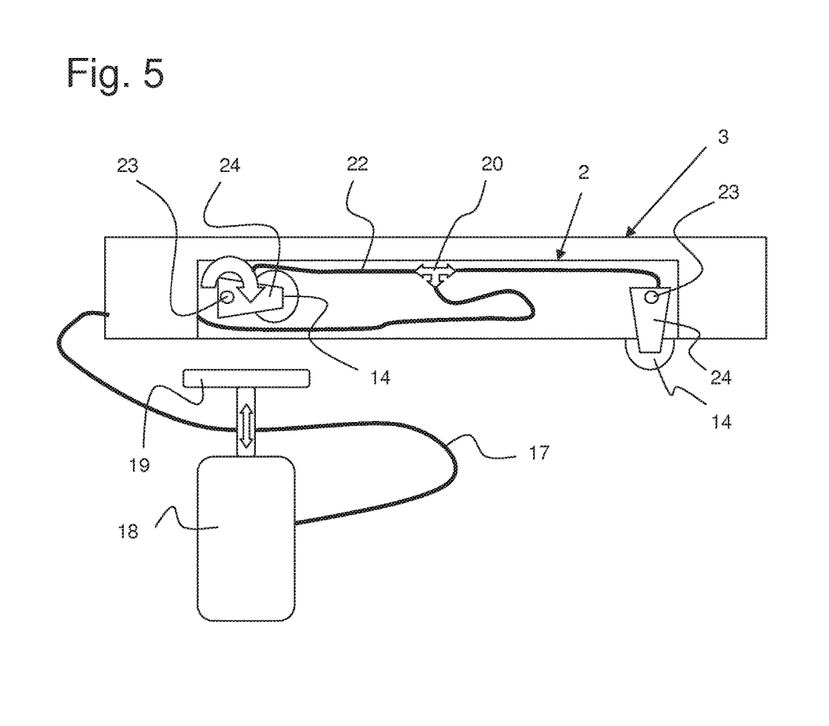
FIG. 5: An apparatus provided with a hydraulic raising device for extending the wheels.

FIG. 5 shows an alternative embodiment for the extension of the wheels. The wheels can be extended in accordance with the invention not only linearly, since an outwardly pivotable extension is also possible. For this purpose, the wheels 14 are pivotally mounted in the box-like insert 2, wherein they are provided with pivotable chassis 24. These pivotable chassis 24 can be mounted both on fixed axes 23, which are designed as stationary axes for the box-like insert, but these axes 23 may be also mounted on hubs, which are rotatable via ball bearings about a vertical axis with respect to the box-like insert, thus enabling free steering of the same extended wheels 14. The pivoting, as indicated by the arrow, is carried out by means of a hydraulic system. A hydraulic hose 17 leads from a hydraulic pump 18, which is provided with a hydraulic oil reservoir and functions like a bicycle pump with a handle 19, to a multiway valve in the inner part of the box-line insert 2. The hydraulic oil flows from the multi-way valve 20 to each chassis 24, where each hydraulic piston-cylinder unit converts the hydraulic pressure into mechanical force for pivoting the chassis 24 with the wheels 14 about the chassis axles 23. The hydraulic pump 18 is equipped with corresponding one-way valves and check valves, so that the extended chassis can be maintained in their extended position. In order to reduce the load, the valve in the hydraulic pump 18 changes over to the reversed flow direction, and the hydraulic oil is then fed back by the pumping into the hydraulic oil reservoir of the hydraulic pump 18, while the wheels 14 are pivoting inwardly and the object 1 is being lowered.

Figure 6:
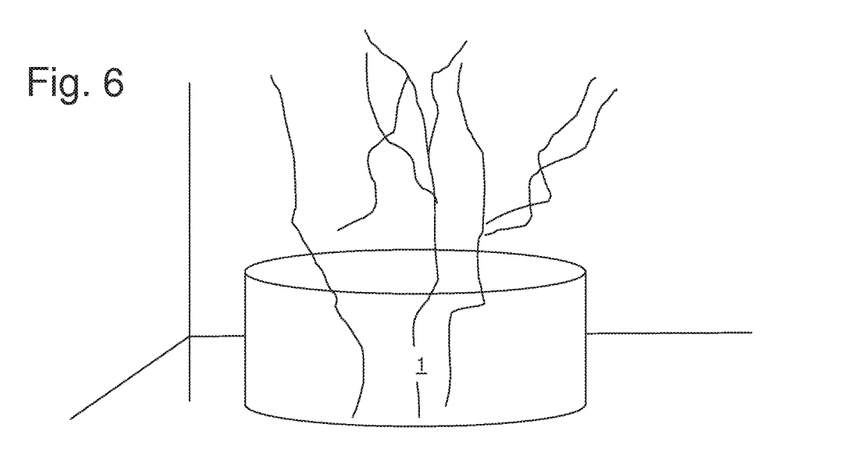
FIG. 6: An object with retracted wheels.
Figure 7:
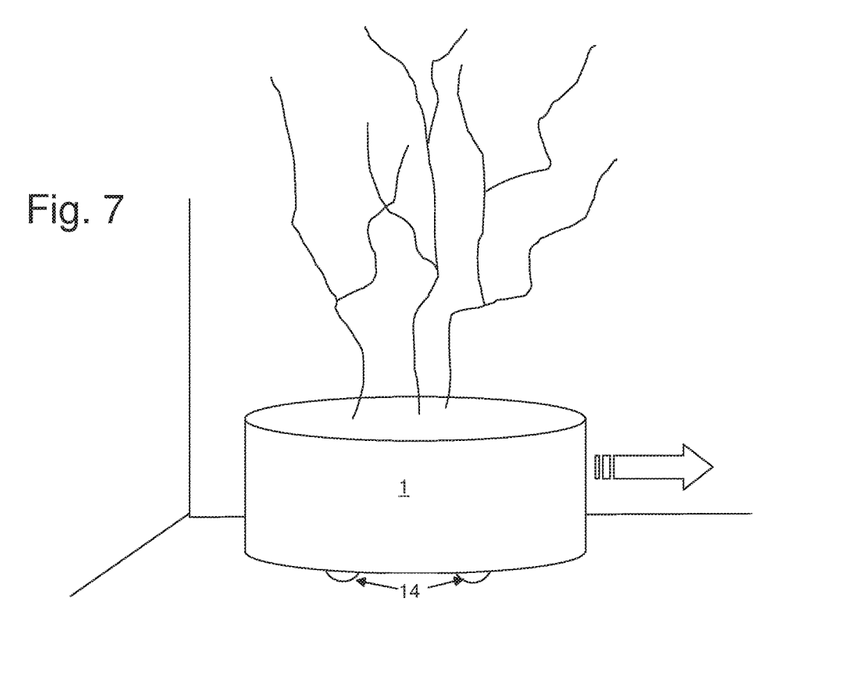
FIG. 7: An object with extended wheels.
Figure 8:
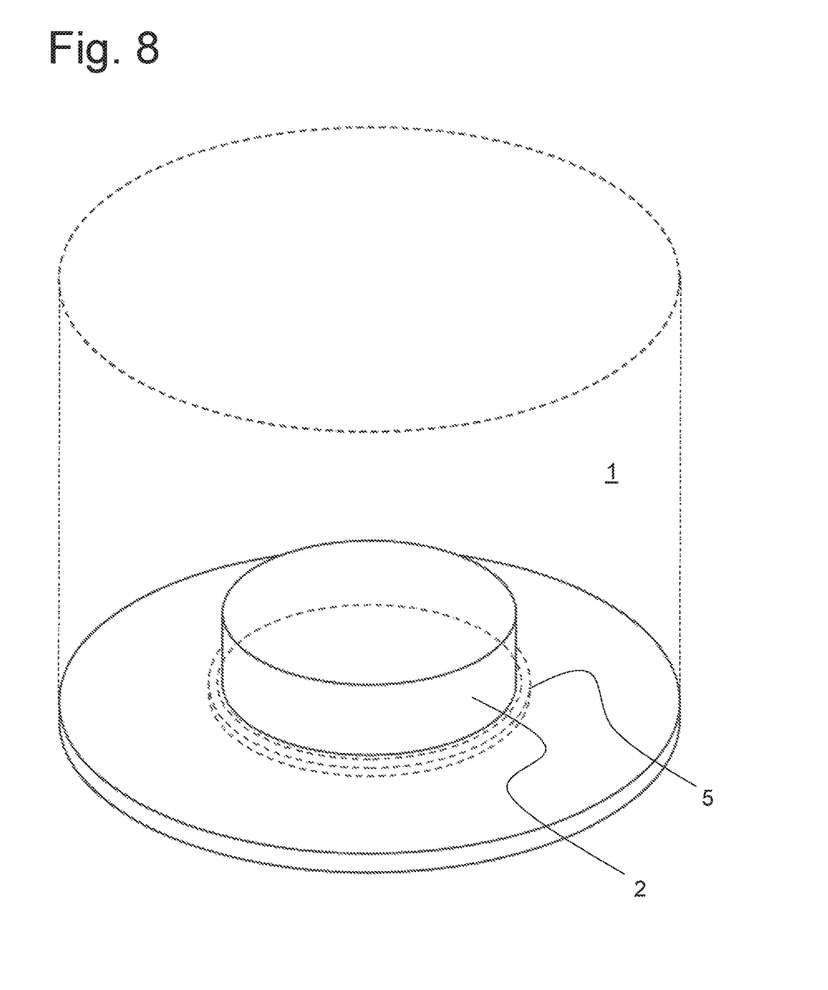
FIG. 8: An object with circular shape and the device fitting into its underside.

FIG. 6 shows such an object 1 as a plant box, which is placed in the corner of a room. Since the box is filled with potting soil, it is very heavy and therefore difficult to move. With the device which is installed at its base, it can now be easily operated with a hand pump, so that the wheel of the device are extended downward pneumatically or hydraulically, swung out and the entire plant box is raised as shown in FIG. 7. The plant box can now be moved very easily on these wheels 14 and after that rolled back again, or lowered to a new location when the cushion is emptied.

Figure 9:
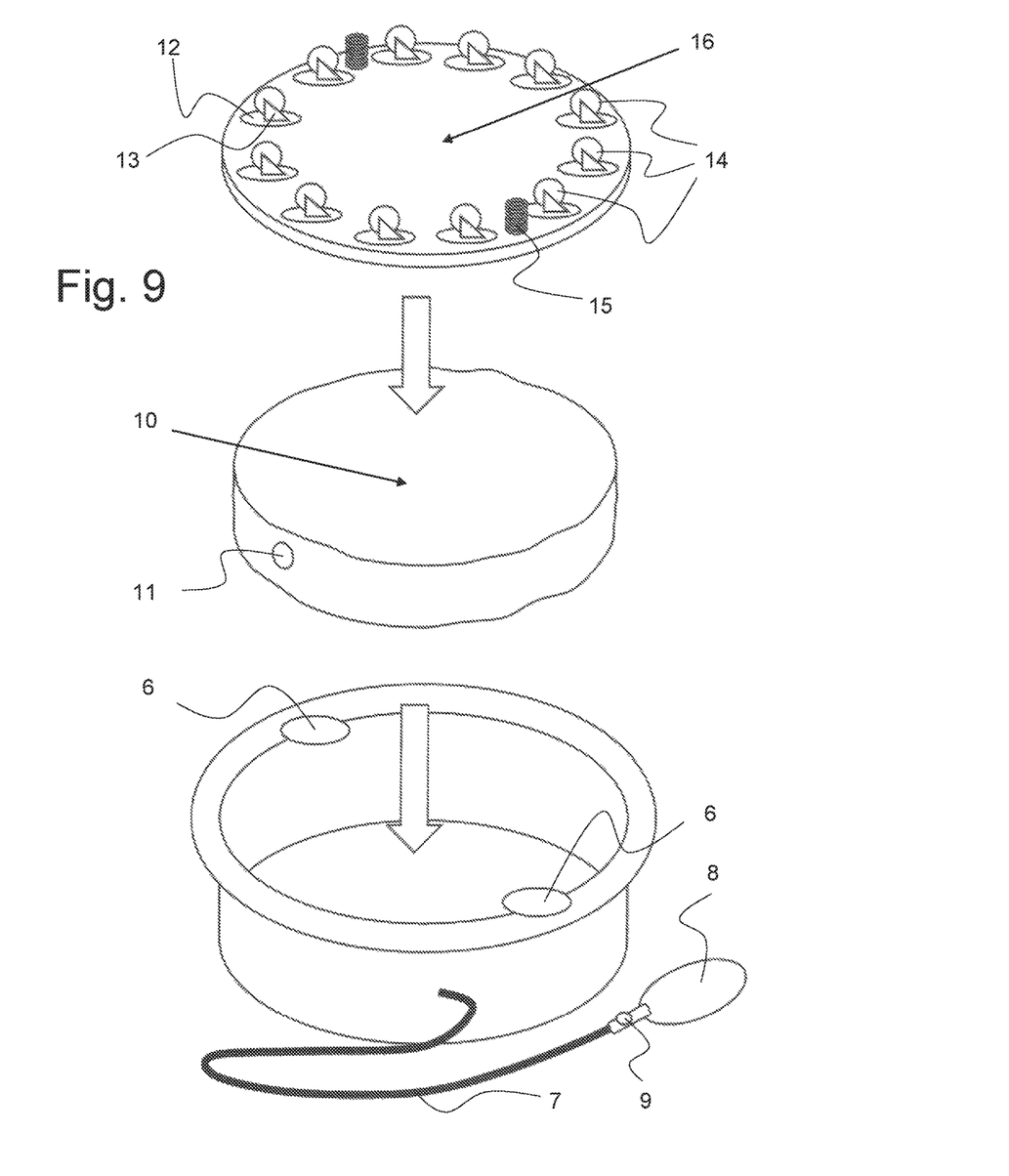
FIG. 9: The individual elements of a circular device shown separately in upside-down position.
Figure 10:
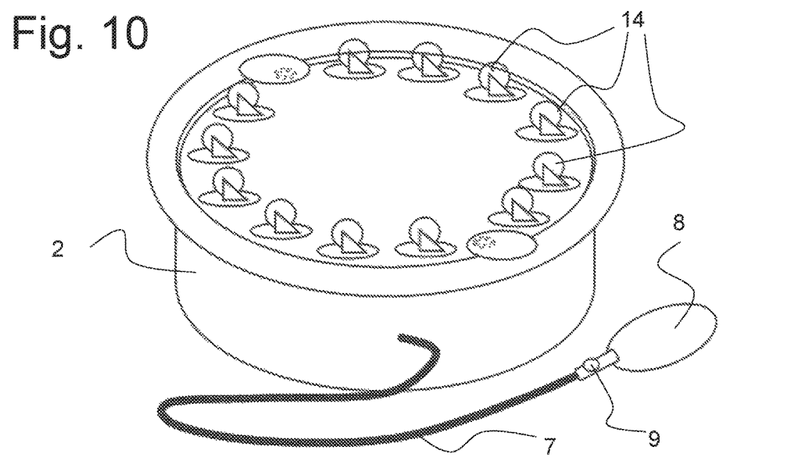
FIG. 10: The device of FIG. 9 in upside-down position with extended wheels.
Figure 11:
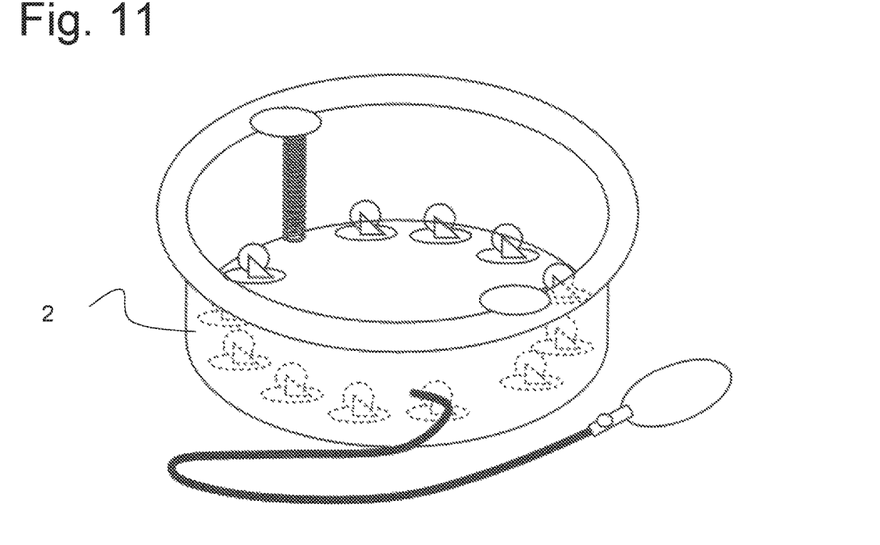
FIG. 11: The device of FIG. 9 in upside-down position with retracted wheels.
Figure 12:
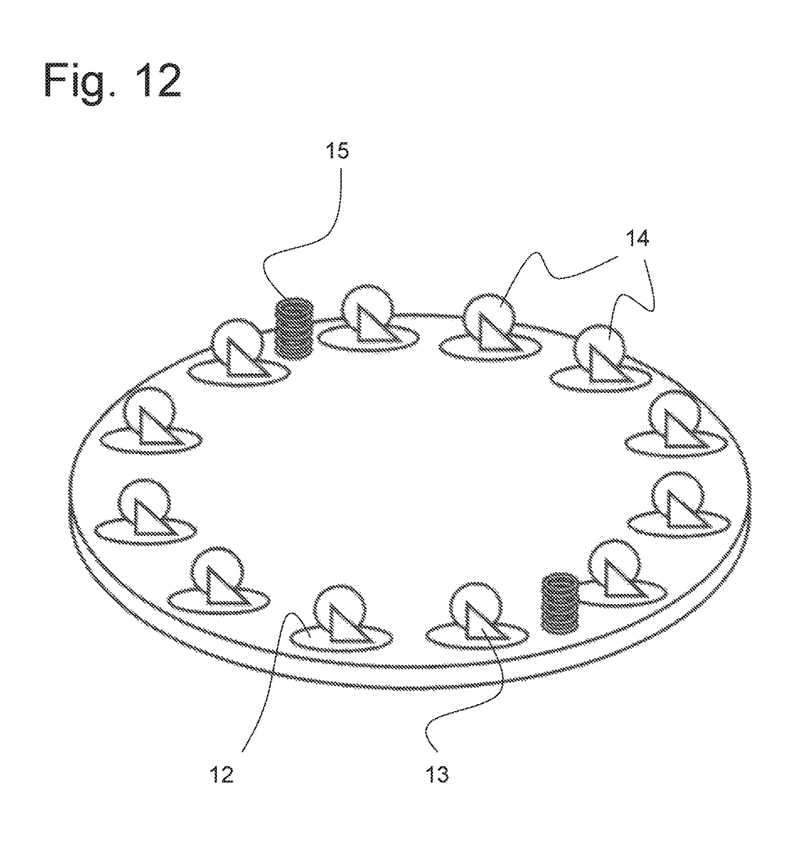
FIG. 12: The sheet metal plate of FIG. 9 with wheels along its circumference.

With large, round flowerpots, it is advantageous when the box-shaped insert is realized with a circular design, as well as the sheet metal plate 16 having the freely steered wheel on top thereof. Similarly, it is then also advantageous when the cushion 10 is realized with a circular design, although another shape will also be effective. When the flowerpot is large and heavy, it is recommended when more than only three or four wheels are employed. With a circular insert 2, it is advantageous when five to twelve wheels are arranged so that they are distributed along the periphery of the sheet metal plate 16 to provide excellent and uniform support for the object.

The invention claimed is:

1. A device for raising and moving an object (1), provided with a pneumatic lifting apparatus and with an associated hand pump (8, 18) and a valve (9) for temporarily extending wheels (14) of said device downward, so that the object (1) can be raised and then rolled away on the wheels (14) of said device, characterized in that:
    said device forms an insert (2) in the form of a sheet metal box which has an edge (5) projecting downward, and the insert (2) can be inserted in upside-down position into a recess in a lower side (3) of the object (1) or can be fixed on or support the lower side (3) of the object (1), wherein the sheet metal box contains an air cushion (10) provided with a port (11), and on the air cushion (10) is placed a plate (16) equipped with wheels (14) on an outer side of the plate (16) facing away from the air cushion (10), the wheels (14) numbering at least three, and wherein the plate (16) can be moved upward and downward in the sheet metal box along lateral walls of the sheet metal box; and
    wherein at least two compression springs (15) are incorporated between an inner base surface of the sheet metal box and the plate (16), are vertically positioned on the inner base surface and on the plate (16), and can be compressed when the air cushion (10) between the inner base surface of the sheet metal box which forms the insert (2) and said plate (16) is pumped up, so the wheels (14) on the outer side of the plate (16) carry the device and allow motion of the object (1) raised by the device, and when the air cushion (10) is empty, due to spring forces created by the relaxation of the at least two compression springs (15), the plate (16) can be pressed away from the edge (5) and into the sheet metal box which forms the insert (2); and
    wherein said wheels on the outer side of the plate (16) form an undercarriage which can be completely retracted into the sheet metal box which forms the insert (2) so that the wheels (14) do not pass over the edge (5) of the sheet metal box when the air cushion (10) is empty.

2. The device according to claim 1, characterized in that the air cushion (10) is designed so as to be congruent with the inner base surface of the sheet metal box, and the plate (16) is a sheet metal plate and is placed congruently on the air cushion (10).

3. The device according to claim 1, characterized in that the plate (16) is a sheet metal plate equipped on the outer side across from the sheet metal box which forms the insert (2) with four freely steerable wheels (14), which are supported on the sheet metal plate (16) by hubs (12) via ball bearings.

4. The device according to claim 1, characterized in that the sheet metal box which forms the insert (2), the air cushion (10) and the plate (16) are circular, and the wheels (14) number at least four freely steerable wheels arranged on the plate (16) so the wheels (14) are distributed along an edge section of a periphery of the plate (16).

5. The device according to claim 1, characterized in that the metal sheet box which forms the insert (2), the air cushion (10) and the plate (16) are circular, and the wheels (14) number less than or equal to twelve freely steerable wheels arranged on the plate (16) so the wheels (14) are distributed along an edge section of a periphery of the plate (16).

6. The device according to claim 2, characterized in that the plate (16) is equipped on the outer side across from the insert (2) with four freely steerable wheels (14), which are supported on the sheet metal plate (16) by hubs (12) via ball bearings.

7. The device according to claim 2, characterized in that the sheet metal box which forms the insert (2), the air cushion (10) and the plate (16) are circular, and the wheels (14) number greater than or equal to four freely steerable wheels arranged on the plate (16) so the wheels (14) are distributed along an edge section of a periphery of the plate (16).

8. The device according to claim 2, characterized in that the sheet metal box which forms the insert (2), the air cushion (10) and the plate (16) are circular, and the wheels (14) number less than or equal to twelve freely steerable wheels arranged on the plate (16) so the wheels (14) are distributed along an edge section of a periphery of the plate (16).

9. The device according to claim 3, characterized in that the sheet metal box which forms the insert (2), the air cushion (10) and the plate (16) are circular, and the wheels (14) number less than or equal to twelve freely steerable wheels arranged on the plate (16) so the wheels (14) are distributed along an edge section of a periphery of the plate (16).

10. The device according to claim 6, characterized in that the sheet metal box which forms the insert (2), the air cushion (10) and the plate (16) are circular, and the wheels (14) number less than or equal to twelve freely steerable wheels arranged on the plate (16) so the wheels (14) are distributed along an edge section of a periphery of the plate (16).

11. The device according to claim 7, characterized in that the sheet metal box which forms the insert (2), the air cushion (10) and the plate (16) are circular, and the wheels (14) number less than or equal to twelve freely steerable wheels arranged on the plate (16) so the wheels (14) are distributed along an edge section of a periphery of the plate (16).

12. A device for raising and moving an object, the device comprising:
- an insert defining a recess and having an edge;
- an air cushion disposed in the recess,
- a plate slidablely disposed in the recess adjacent the air cushion, the plate having an outer side opposite the air cushion;
- at least three wheels attached to the outer side; and
- at least two compression springs operably connected between the insert and the plate to bias the plate toward the air cushion;
- wherein the at least three wheels retract into the recess above the edge when the air cushion is deflated and the at least three wheels project out of the recess beyond the edge when the air cushion is inflated.

* * * * *